F. J. MAUBORGNE.
COTTON OPENING AND GINNING MACHINE.
APPLICATION FILED APR. 30, 1906.

969,176.

Patented Sept. 6, 1910.
11 SHEETS—SHEET 1.

Fig. 1.

F. J. MAUBORGNE.
COTTON OPENING AND GINNING MACHINE.
APPLICATION FILED APR. 30, 1906.

969,176.

Patented Sept. 6, 1910.
11 SHEETS—SHEET 2.

F. J. MAUBORGNE.
COTTON OPENING AND GINNING MACHINE.
APPLICATION FILED APR. 30, 1906.

969,176.

Patented Sept. 6, 1910.
11 SHEETS—SHEET 3.

F. J. MAUBORGNE.
COTTON OPENING AND GINNING MACHINE.
APPLICATION FILED APR. 30, 1906.

969,176.

Patented Sept. 6, 1910.
11 SHEETS—SHEET 4.

Witnesses
Inventor
Francis Joseph Mauborgne

THE NORRIS PETERS CO., WASHINGTON, D. C.

F. J. MAUBORGNE.
COTTON OPENING AND GINNING MACHINE.
APPLICATION FILED APR. 30, 1906.

969,176.

Patented Sept. 6, 1910.
11 SHEETS—SHEET 5.

F. J. MAUBORGNE.
COTTON OPENING AND GINNING MACHINE.
APPLICATION FILED APR. 30, 1906.

969,176.

Patented Sept. 6, 1910.
11 SHEETS—SHEET 6.

F. J. MAUBORGNE.
COTTON OPENING AND GINNING MACHINE.
APPLICATION FILED APR. 30, 1906.

969,176. Patented Sept. 6, 1910.
11 SHEETS—SHEET 10.

Attest:
Edgeworth Greene
N. J. McGinn

Inventor:
Francis Joseph Mauborgne

UNITED STATES PATENT OFFICE.

FRANCIS JOSEPH MAUBORGNE, OF NEW YORK, N. Y.

COTTON OPENING AND GINNING MACHINE.

969,176.      Specification of Letters Patent.     Patented Sept. 6, 1910.

Application filed April 30, 1906. Serial No. 314,568.

*To all whom it may concern:*

Be it known that I, FRANCIS JOSEPH MAUBORGNE, a citizen of the United States, and a resident of New York city, in the county of New York and State of New York, have invented a certain new and useful Improvement in Cotton Opening and Ginning Machines, of which the following is a specification.

The primary object of this invention is to secure a longer and cleaner staple or fiber in ginned cotton than is secured by methods of ginning heretofore in use, thereby enhancing the price received for cotton by the planter and at the same time enabling the cotton spinner to produce a better and stronger thread; this object is attained by subjecting the raw cotton (or cotton in the condition in which it comes from the field) to a more or less prolonged picking and opening operation preliminary to the step of separating the fibers from the seeds, whereby the cotton fibers are combed and opened while still on the seeds and are disentangled from each other to such an extent, and are cleaned of leaf, dirt, etc., that the operation of separating the fibers from the seeds causes the separation to take place at or near to the points of attachment of the fibers to the seeds, and the staple to come out cleansed from extraneous matter and partly prepared for the spinning operations.

Another object is to condense the cleaned cotton; and other objects will appear hereinafter.

The invention consists of features of construction, arrangements and combinations of devices hereinafter described and more particularly pointed out in the appended claims.

The invention is embodied in the machine illustrated in the accompanying drawings, forming part hereof, in which—

In the drawings, the reference character 1 designates a frame, which may be of any suitable form, construction, and materials. In the particular instance illustrated, the said frame comprises four legs, marked 2; horizontal rails 3 carried by said legs; and transverse bars 4 connecting said rails and legs.

Figure 1:
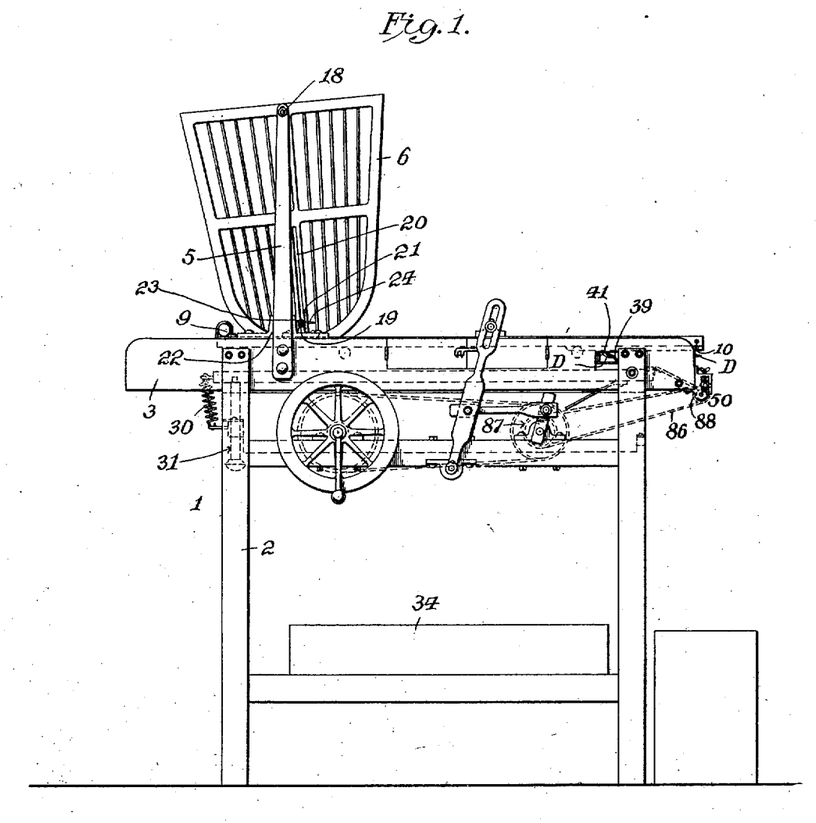
Figure 1 is a side elevation.

The reference 5 marks uprights for supporting the rocking hopper 6 (see Fig. 1.)

Figure 2:
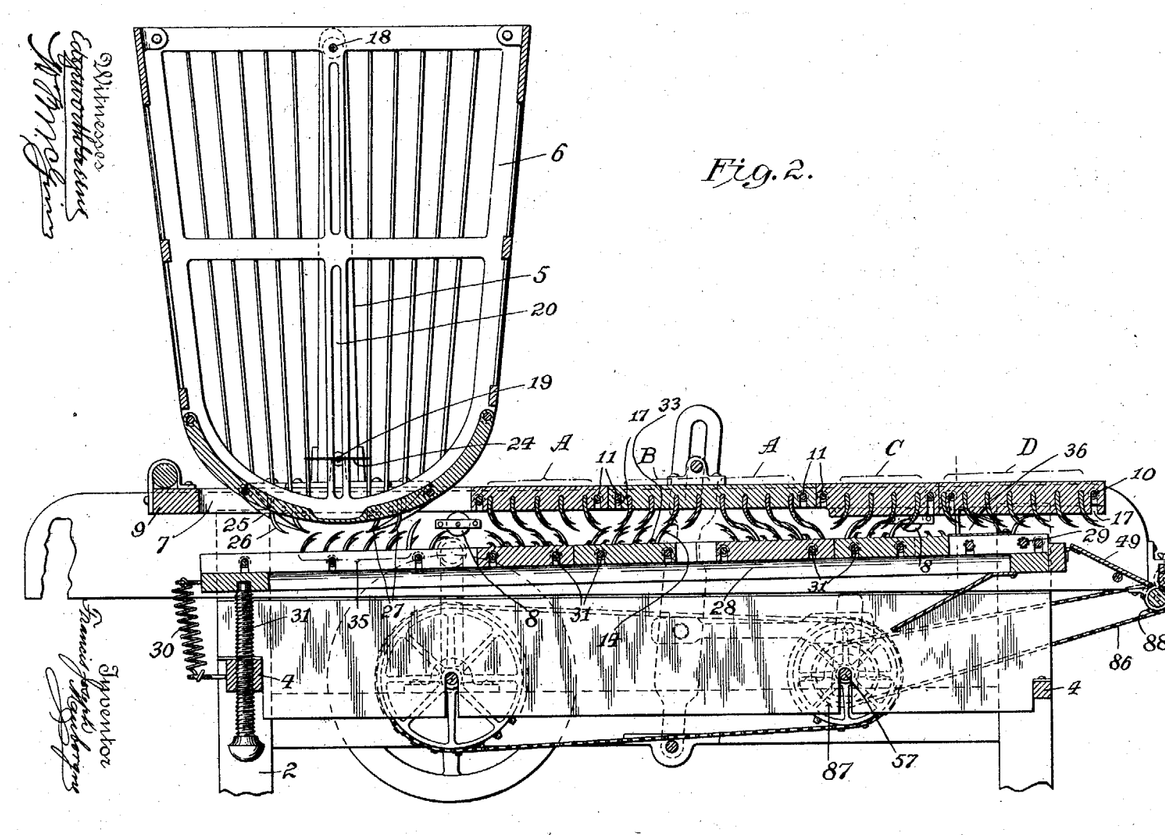
Fig. 2 is a vertical longitudinal sectional view of the upper part of the machine.
Figures 4, 5:
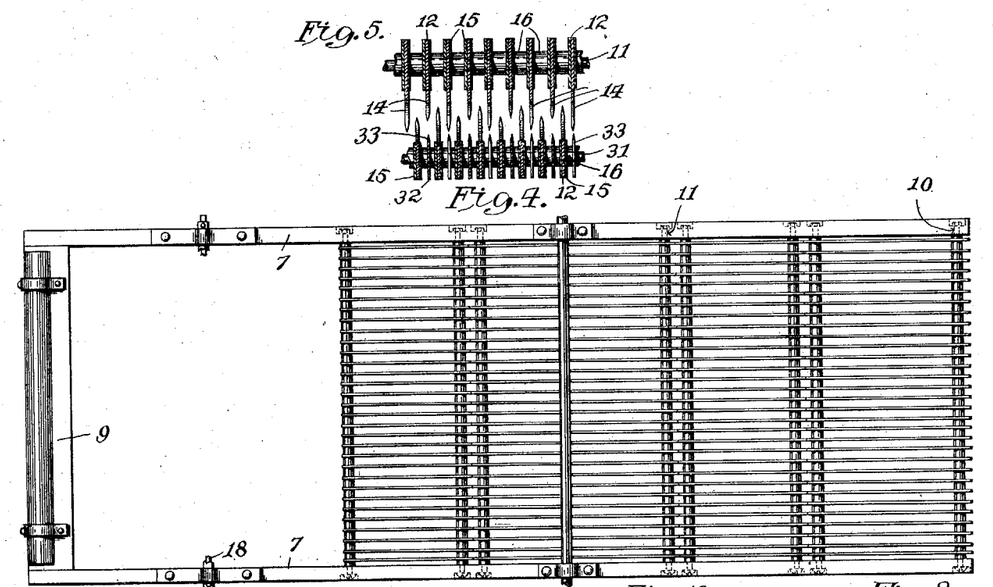
Fig. 4 is a plan of the upper half of the carder.
Fig. 5 is a partial vertical transverse section through the two carders.

The reference 7 designates two side-pieces of a carriage which runs on rollers 8 on the rails 3 (see Figs. 4 and 2). At one end, the side-bars 7 are joined by the tie 9, and at the other end, by the tie-rod 10, and at intervals between the ends, by other rods 11. The rods 10, 11, also have a function in connection with the mounting of the hooks hereinafter described.

Figure 6:
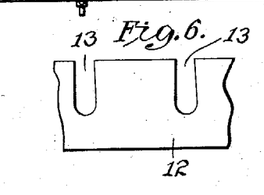
Fig. 6 is a detail of a hook-bar.
Figure 7:
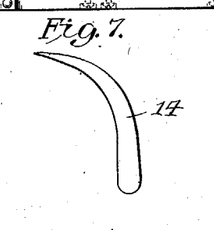
Figs. 7 and 8 illustrate two forms of hooks.

Referring more particularly to Figs. 6 to 10, inclusive: the reference 12 marks a flat metal bar or strap having the recesses 13 formed therein at one side thereof, said openings or recesses 13 being slightly narrower at their mouths than elsewhere and having rounded ends, as shown in Fig. 6. These openings 13 are provided to receive the bases of the hooks 14 (or 14ˣ) which fit therein; and 15 marks side plates or straps which are put alongside the hook-holders 12, the holders 12 and the cheek-pieces 15 being perforated to receive the rods 11 and 10, and washers 16 being provided between adjacent sets of holders and cheeks to space the hooks 14 at desired distances apart. It will be noted that the hooks 14 may be placed in the openings 13 with their points in either direction, the parts being designed for that purpose. (See Fig. 2.) It is noted, also, that the hooks 14 are arranged in groups or zones, the hooks in one zone pointing oppositely to the hooks in the next group or zone. Thus, the group "A" (Fig. 2) of hooks 14 have their hooks pointing toward the delivery end of the machine, while the two groups or zones "B" and "C" have their hooks pointing toward the hopper-end of the machine, and the delivery hooks (zone "D") point in the same direction as the hooks of zones "A". The hooks of zones "A" may be described properly as carding hooks or card-hooks, and so also of the hooks in zone "B", while the function of the hooks in the zone "C" is such that these hooks may be called the recall-hooks, as will hereinafter appear. From their function, the hooks of zones A may be called "carrier" hooks, as they carry the cotton forward toward the delivery end of the gin. By making the hook-holders 12 in short lengths, any length may be removed without having to take out the whole, by providing such holders with slots 17 for slipping down over the rods 10 11, for the rods 10 11 may be slacked up, being held in place by screws or threaded nuts and heads (indicated in Fig. 4), and any length 12 can then be lifted out, with its attached hooks, and can be replaced or substituted, after which the rods are tightened up again, to clamp said holders firmly in place.

Figure 9:
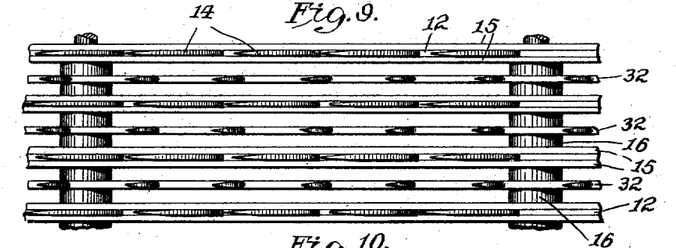
Fig. 9 is a partial plan of the lower of the two carders.
Figure 10:
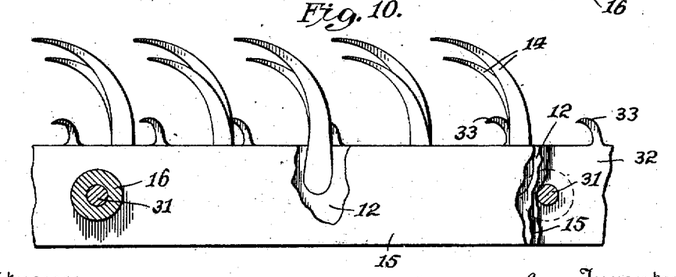
Fig. 10 is a side elevation of the same.

It is noted that the hooks 14 shown, in Figs. 9 and 10 are flat and that their flat sides are parallel with the lines of motion of said hooks of the upper opener; this is a feature of some importance, since the flat hooks appear to act better than round hooks in opening cotton, though, of course, sharp edges are to be avoided. It is also noted that such hooks are bent in the plane of their motion, or in planes parallel to such planes of motion of the hooks of the upper opener, as the case may be.

The hopper 6 is mounted on the carriage near one end thereof. In the instance illustrated in Figs. 1, 2, 3, 16, 17 and 18, the hopper is mounted on a rod 18 to be swung therefrom by its connection with the rod 19, which is mounted on the carriage. The said rod 19 passes loosely through a slot 20 in the side of the hopper, there being some play between the sides of the slots 20 (one at each side of the hopper) and the said rod 19. The hopper 6 has a short rack 21 fast thereto adjacent to a slot 20, and the rod 19, which is suitably journaled in brackets 22 on the carriage, is provided with a small pinion 23, which, as the carriage moves forward toward the delivery end of the machine, is brought into mesh with the said rack 21 and is rotated thereby during such forward strokes of the carriage. The shaft 19 is provided with pointed arms 24, which, during the rotation of the shaft 19 as aforesaid, stir up and carry down cotton through the slatted bottom of the hopper, to be caught by the taking-hooks 35 hereinafter mentioned.

Figure 16:
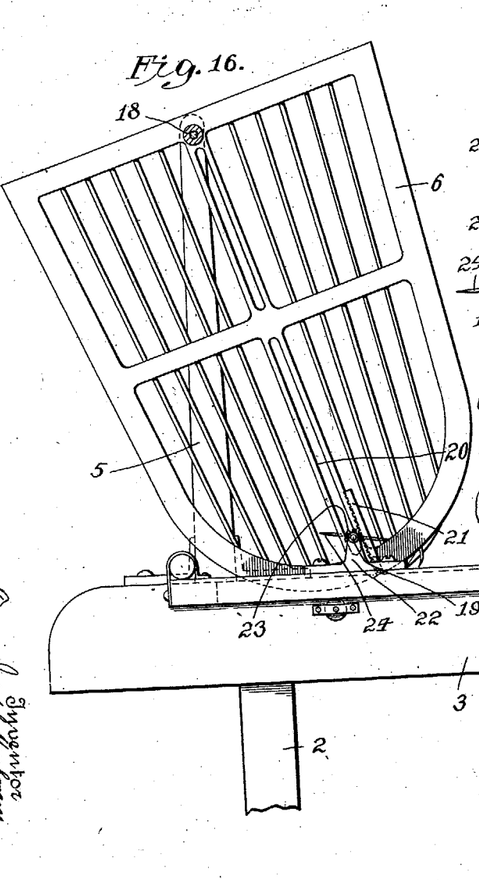
Figs. 16 and 17 are two views showing the hopper in different positions.
Figure 17:
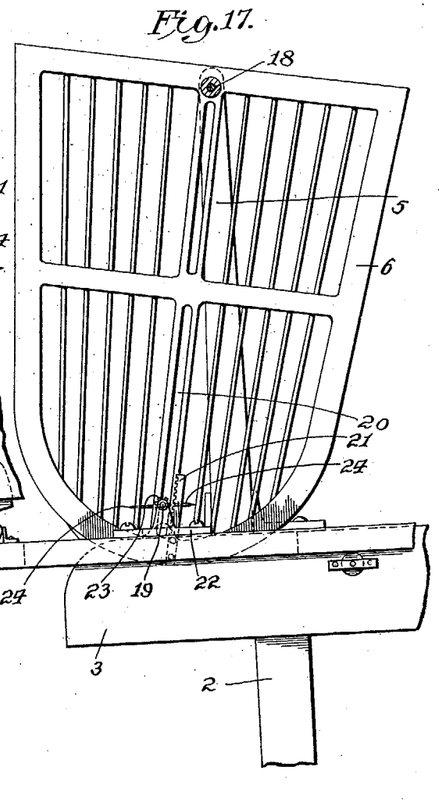
Figure 18:
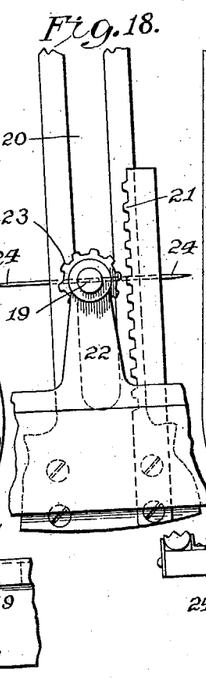
Fig. 18 is a detail view of a part of the hopper shown in Figs. 16 and 17.

25 marks fingers in the bottom of the hopper for preventing the cotton from passing downward too fast, and 26 27 mark reversely placed hooks on the bottom of the hopper 6 which coact with hooks in the lower carder. During the return strokes of the said carriage, the rack 21 is not in mesh with the pinion 23, as is indicated in Fig. 17. It is only necessary to push down cotton for the taking-hooks of zone 35 to remove from the hopper, once for each double motion of the bed and hopper, hence, as indicated in Fig. 16, the rack 21 actuates the pinion 23 toward the end of the forward strokes of the bed or upper opener and during the beginning of the return strokes, after which the rack is disengaged, and so remains, as is shown by Figs. 17 and 18.

Figure 11:
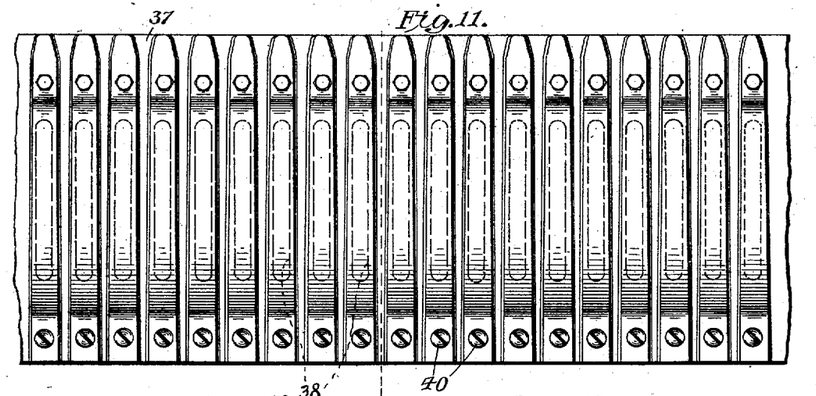
Figs. 11, 12 and 13 are plan, front, and end views, respectively, of the ginning grid shown in Fig. 3.
Figure 12:
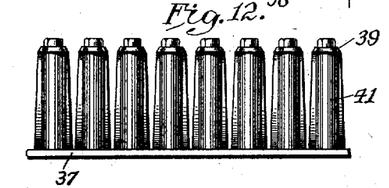
Figure 13:
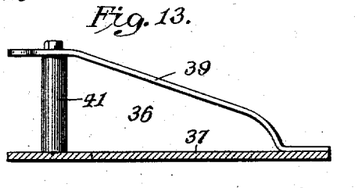
Figure 14:
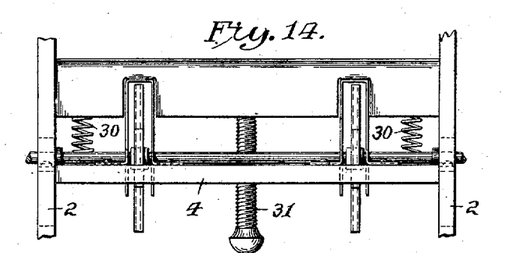
Figs. 14 and 15 are end and plan views, respectively, of the adjustable frame carrying the lower carder.
Figure 15:
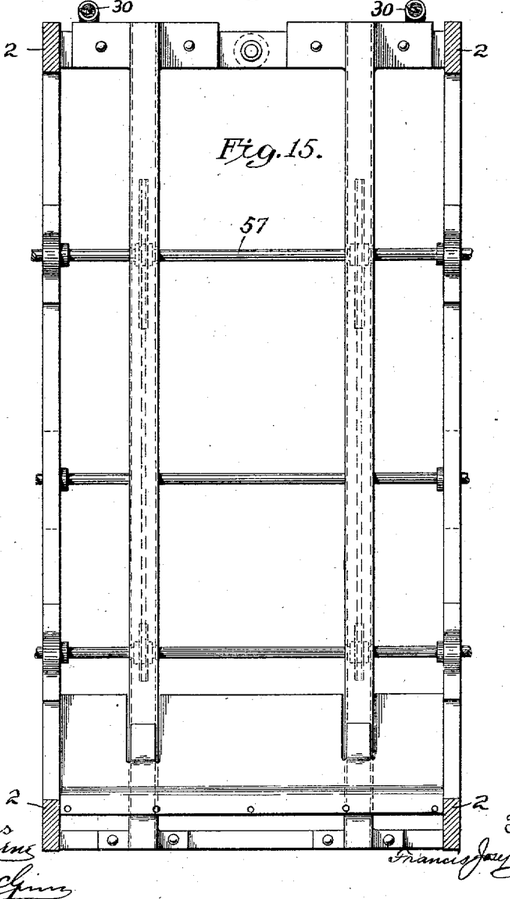

The reference 28 marks a frame which is pivoted at 28 to the main frame of the machine, and the other end of which is drawn down by the springs 30 against the adjustable screw 31$^x$. The frame 28 has tie-rods 31 therein, similar to the rods 10 and 11, and on these rods 31 are mounted hook-holders 12 and cheeks 15 separated by washers 16, as well as strips 32 which have hooks 33 up the upper side thereof; these hooks 33 are shorter than the hooks 14 (which themselves are in two lengths, as shown in the lower part of Fig. 5) and may be called ground-hooks, their function being to catch the lint surrounding the seeds as these drop down and to separate the lint from the seed more thoroughly. During the operation of gradually opening and loosening the cotton fibers while still on the seeds, the dirt, broken leaf, sand, etc., fall out through the openings in the lower opener member. The hooks 14 in the lower carder are also divided into zones or groups, the zone 35 being arranged to catch staple from the bottom of the hopper during the return strokes of the carriage. Every other zone in the lower carder has its hooks pointing toward the delivery end of the machine, and the remaining zones have their hooks pointing in the reverse direction. Toward the delivery end of the machine, the frame 28 has a grid 36 through which the delivery hooks of zone "D" carry staple, the grid stopping the seeds, if any seed are carried that far during the operation of the machine. This grid 36 may be formed in many ways, and three ways are shown in the drawings. Thus, in Figs. 11, 12 and 13, the grid is composed of a bottom plate 37 which is slotted at 38 for the passage of seed, a series of tongues 39 which are secured at one end to the plate 37 by screws 40, and a series of uprights 41 each consisting of a tubular sleeve, and a screw-bolt which passes through such sleeve and screws into the plate 37. The projecting ends of the tongues 39 are tapered as shown in Figs. 11 and 12. The tongues 39 are closer together than are the uprights 41, and are so set for the purpose of stopping the seeds, which seeds pass between the uprights 41, all as indicated in Figs. 12 and 20, when the delivery hooks carry the cotton through the grid 36.

Figure 23:
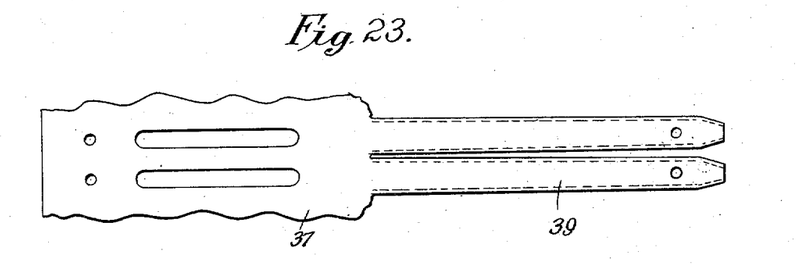
Figs. 23 and 24 are views of a blank for and a grid, respectively.
Figure 24:
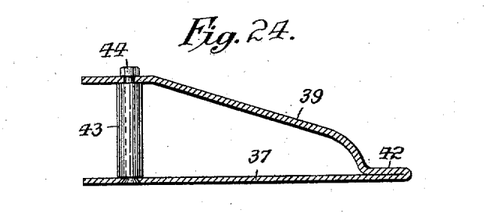

A modified form of the grid is shown in Figs. 23, 24, wherein the tongues 39 are made integral with the plate 37, and the whole is bent back on itself at 42, and the free ends of the tongues are secured to the plate 37 by tubular sleeves 43 and headed rods 44 which are riveted to the plate 37.

Figure 25:
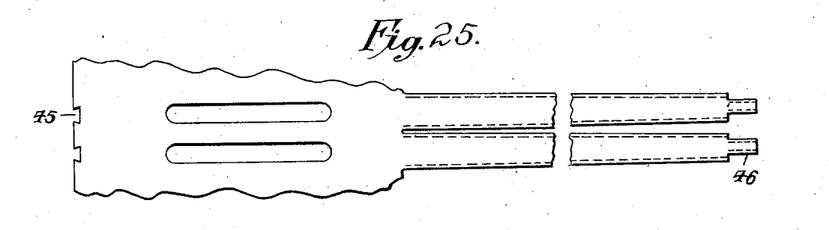
Figs. 25, 26 and 27 are views of a blank for and a modified form of grid.
Figure 26:
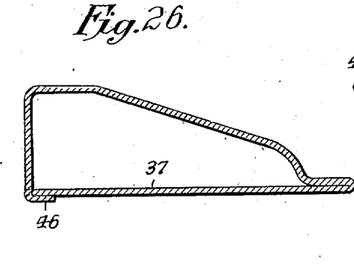
Figure 27:
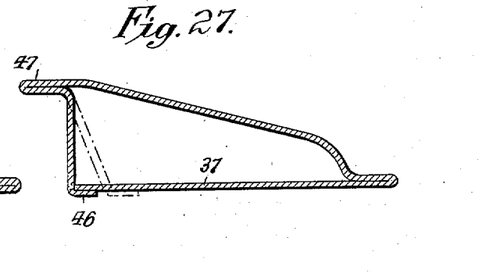

By forming the blank as shown in Fig. 25, with notches 45 and bending the blank as indicated in Fig. 26, the grid is made of one piece, the ends of the tongues being bent under the plate 37 as indicated at 46. By making the tongues longer, the said grid may be formed with projecting parts 47; and the upright may be given an incline as indicated in dotted lines in Fig. 27.

Figure 19:
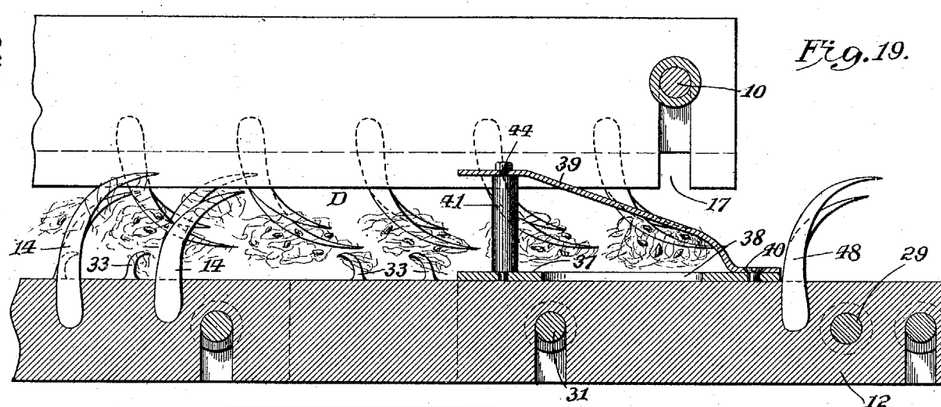
Figs. 19 and 20 are views illustrative of the action of ginner and adjacent parts.
Figure 20:
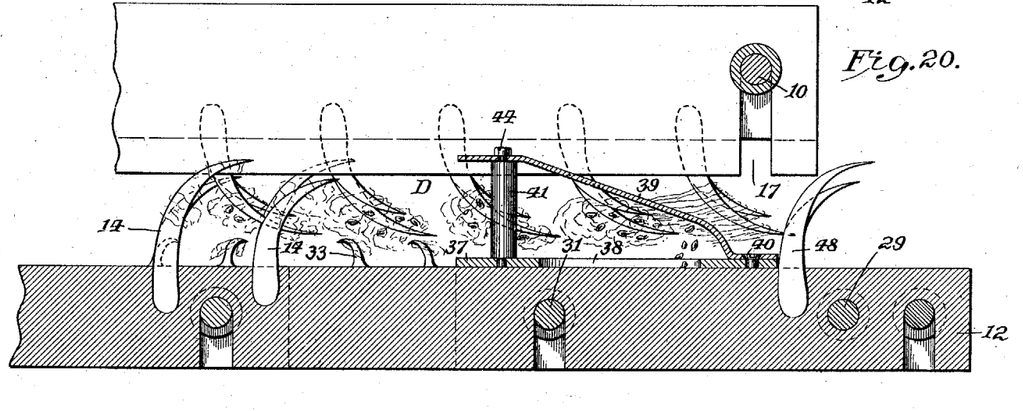

Staple may be removed from the delivery hooks in zone "D" by an air-blast, but it is preferred to use hooks 48 for that purpose, the said hooks being on the lower carder-frame, as shown in Figs. 19 and 20. The staple dropped from the delivery hooks glides down an incline 49 to and between the condensing rollers 50, whence it falls, in sheet form, into a receptacle, or is otherwise disposed of. The pressure of the rollers 50 may be varied by the screws 51, if desired.

For the purpose of driving the described mechanisms, any suitable form of driving mechanism may be used, and in this connection, it is remarked that the carriage may be started, accelerated in speed, stopped, and reversed by many of the mechanisms used in the so-called bed-and-cylinder printing-presses. For the purposes of this specification, I have illustrated two methods of driving the moving parts, and such methods will now be described.

Figure 3:
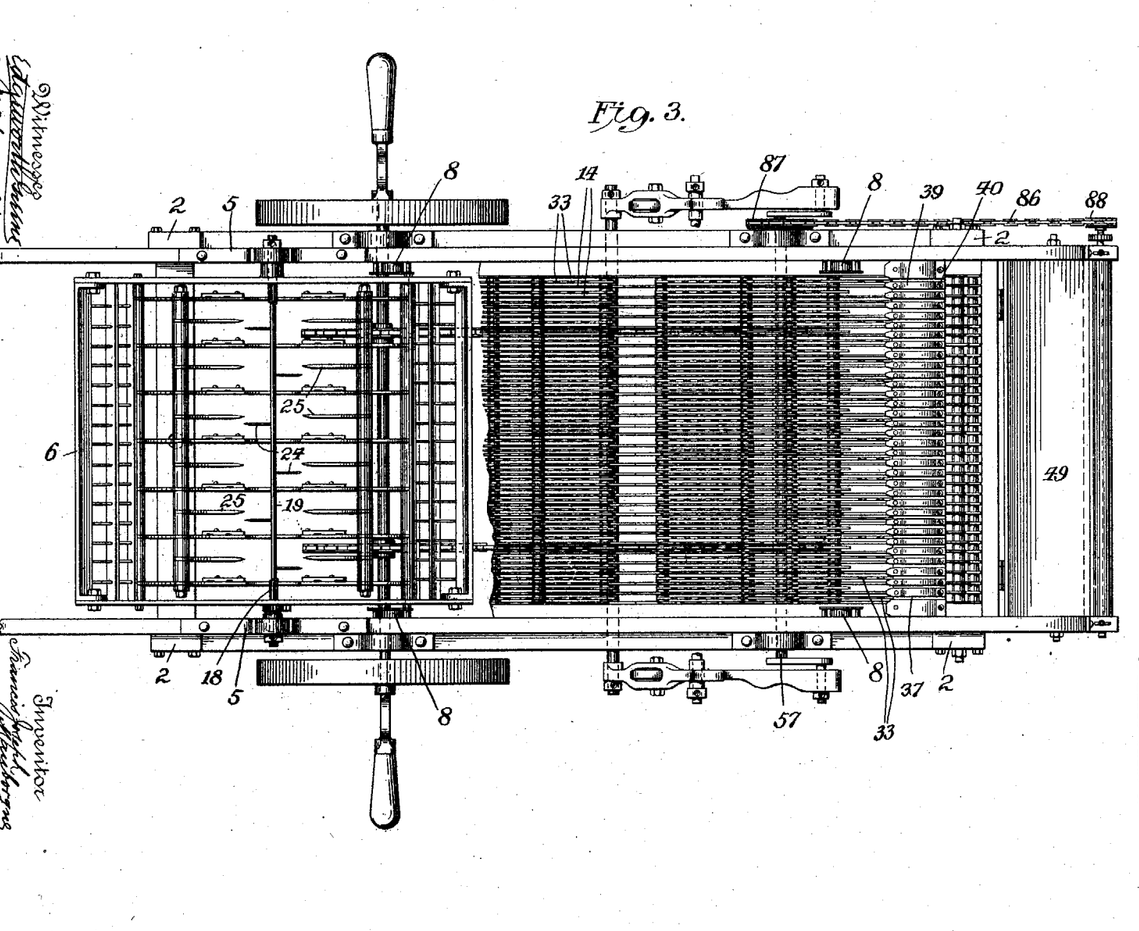
Fig. 3 is a plan.

Referring to Figs. 1 to 3, the reference 52 marks a shaft journaled in the main frame of the machine, which shaft has one or more cranks 53 thereon whereby it may be turned. This shaft also has on it two sprocket wheels 54 on which run the sprocket chains 55. The said chains also run on two sprocket-wheels 56 which are fast on a shaft 57 which is journaled in the main frame also. At each end, the shaft 57 has crank-arms 58 fast thereto, and these arms are connected by links 59 to rocking-arms or levers 60 which are pivotally connected with the main frame at 61, and which, at their free ends, are provided with slots 62 for engagement with the ends of a shaft 63 which is mounted in bearings 64 on the carriage aforesaid. The shaft 63 has collars 65 thereon, between which and the washers 66 the said levers 60 work, the washers being held in place by cotters or other suitable means. On turning the crank or cranks 53, the motion thereof is communicated by the described mechanism to the carriage, which is moved to and fro, carrying with it the hopper and the upper carder; it will be observed that the hopper, through its connection with the fixed arms 6, has a swinging motion. In order to protect the sprocket-chains and wheels of the carriage-motion mechanism from falling dirt and short cotton or other staple (as wool), sheet metal covers 67 are provided, said covers being similar to an inverted U in cross section, and being secured to the cross pieces 4 aforesaid, and being slotted at 68 to slip down over the shafts of the sprocket-wheels. A fixed apron 68 is also provided near the delivery end of the machine to cause the seed and dirt to fall toward the center of the machine and away from the staple coming from the condensing rolls 50.

Figure 21:
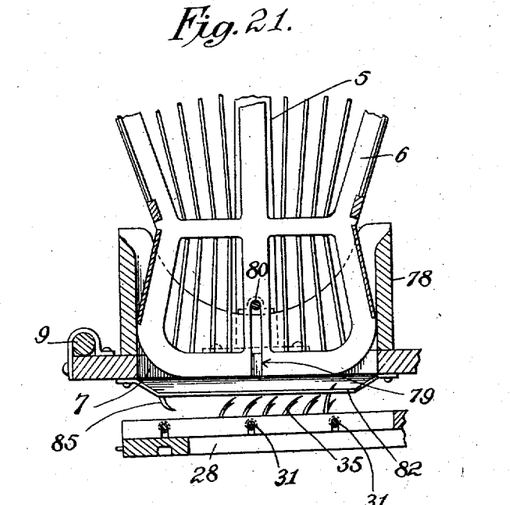
Figs. 21 and 22 are sectional and bottom views, respectively, of a modified form of hopper.

It is remarked that the construction of hopper illustrated in Fig. 21 may also be swung from the arms 5 in the manner illustrated in Fig. 1, as the rounded bottom of the hopper permits the hopper to swing in the box 78.

Figure 28:
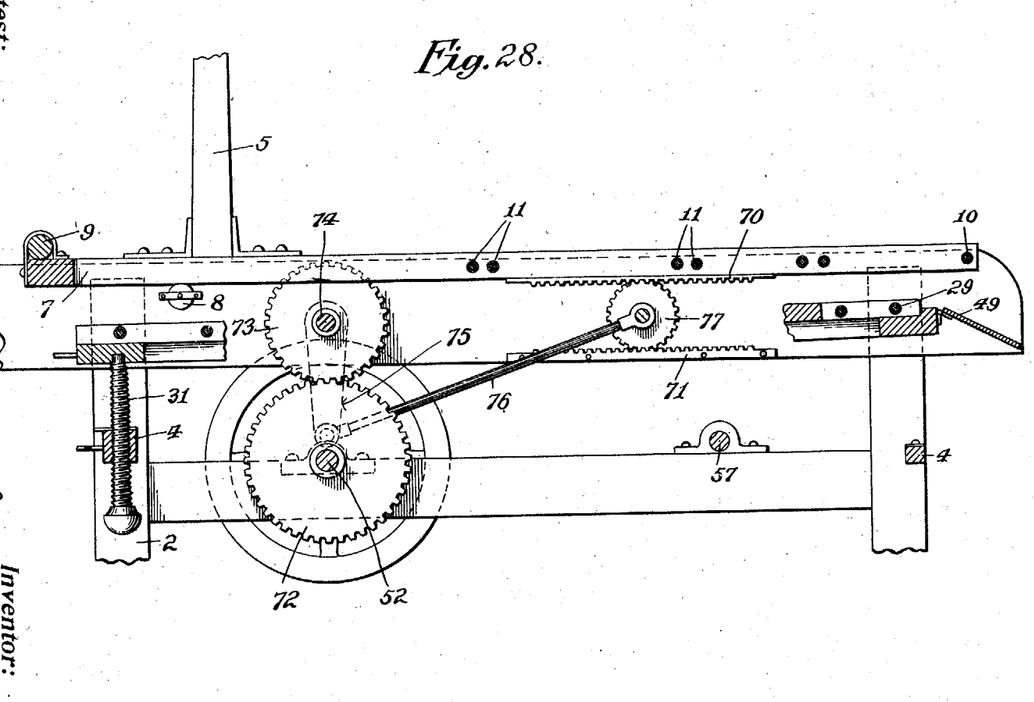
Fig. 28 is a view, partly in section, of a modified form of driving mechanism.

In the arrangement illustrated at Fig. 28, the carriage is provided at its edges with racks 70, and the main frame is provided at 71 with racks which lie directly under the racks 70. The shaft 52 is provided with gear-wheels 72 which mesh with gears 73 fast on a rotary shaft 74 which is journaled in the main-frame. The shaft 74 has cranks 75, to which are connected the rods or pitmen 76; at their other ends, the pitmen 76 are connected with the rolling gears 77, which gears mesh with the racks 70 71. The rotation of the shaft 52 communicates, through the described mechanisms, a to and fro motion to the carriage aforesaid.

Figure 22:
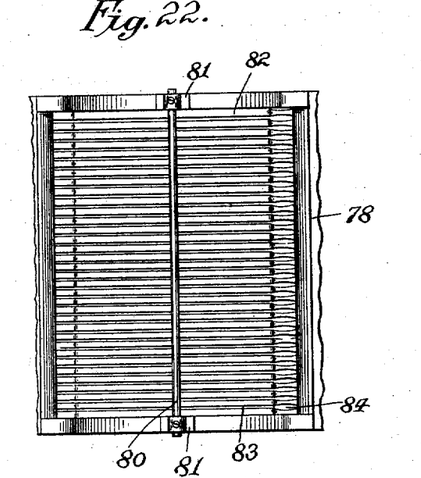

Instead of pivotally connecting the hopper 6 with the main frame and with the carriage, said hopper may be carried wholly by the said carriage, as indicated in the construction illustrated in Figs. 21 and 22, in which the carriage is provided with the box-like hopper-holder 78, and the hopper has slots 79 in its sides (but one slot is shown, however) to allow the hopper to slip down over the shaft 80 and inside the holder 78. The shaft 80 is fast in bearings 81 on the sides of the holder 78, and the hopper has no bottom. Instead, the carriage, below the hopper, is provided with a sheet-metal grid 82 which is pan-shaped and is removably attached, as by screws, to the bottom of the carriage. The grid 82 has slots 83 therein, lying parallel to the direction of motion of the carriage, and with enlarged ends 84 at that side of the hopper which is toward the delivery-end of the machine, said enlargements being for the purpose of allowing seeds to pass through, and the slots 83 themselves being for the purpose of allowing the taking hooks in the zone 35 to catch staple in the hopper and draw it out during return strokes of the carriage or bed. The reference 85 designates hooks attached to or formed with the pan 82 and acting, during forward strokes of the carriage or bed, to carry the staple from the hooks of zone 35, over to the right (in Fig. 2) to the carriers and carders.

The operation of the before-described machine has been indicated from time to time during the description of its constituent parts, so that an extended description thereof does not appear to be necessary. It may be observed, however, that the rows of hooks are so arranged as not to strike each other, as indicated in Fig. 5. It may also be observed that the described machine does little or no injury to the staple, and that it delivers the same in sheet form if the frame 28 be adjusted sufficiently high to cause the taking hooks of zone 35 to take a large amount of staple from the hopper. The process is a gentle pulling apart of the staple during the back and forth pulling action of the hooks, thus allowing dirt to fall out, and also gradually loosening the staple from the seeds so that the seeds are easily removed by the grid 36 when they reach it, and then drop down to the pan 34.

Figure 8:
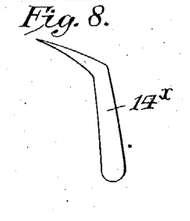

In Fig. 8 is shown a modified form of hook, consisting of two straight parts meeting at an obtuse angle, and one part being shaped to fit the slots 13 aforesaid, while the other part is more or less pointed. These hooks may replace those shown otherwhere in the drawings.

The delivery-hooks may be replaced by pins, though it is preferred that hooks be used, as these pick up the staple and carry it through the ties and through the inclined reeds or tongues 39. It is observed that any seed that may be sticking in the staple are removed by one or the other of the ties 41 and reeds 39.

The condensing rolls 50 are driven from the shaft 57 by a chain 86 and sprocket wheels 87 88, respectively fast on the shaft 57 and on one of the rolls 50. Or the rolls 50 may be driven otherwise.

The carriage 7 may be tilted up or be wholly removed from the machine at any time, for the purpose of cleaning the machine or the cards, in case the latter become clogged, the hopper being first removed, and the levers 60 being uncoupled from the carriage 7.

What I claim as new and desire to secure by Letters Patent of the United States is—

1. The combination with a carriage and a hopper connected to the same, of carrier-, picking and opening-, and delivery-hooks mounted on said carriage, fixed taking-hooks for removing staple from the hopper, fixed carding-hooks, and a grid through which said delivery-hooks draw staple.

2. The combination with a carriage and a hopper connected to the same, of carrier-, picking and opening-, recall-, and delivery-hooks mounted on said carriage, fixed taking-hooks for removing staple from said hopper, fixed carding-hooks, and a grid through which said delivery-hooks draw staple.

3. The combination with a carriage and a hopper connected to the same, of carrier-, picking and opening-, and delivery-hooks mounted on said carriage, fixed taking-hooks for removing staple from said hopper, fixed carding- and ground-hooks, and a grid through which said delivery-hooks draw staple.

4. The combination with a carriage and a hopper connected to the same, of carrier-, picking and opening-, recall-, and delivery-hooks mounted on said carriage, fixed taking-hooks for removing staple from said hopper, fixed carding- and ground-hooks, and a grid through which said delivery-hooks draw staple.

5. The combination with a carriage and a hopper connected to the same, of carrier-, picking and opening-, and delivery-hooks connected to said carriage, fixed taking-hooks for removing staple from said hopper, fixed carding-hooks, and ground-hooks interspersed among said fixed hooks.

6. The combination with a carriage and a hopper connected to the same, of carrier-, picking and opening-, recall-, and delivery-hooks connected to said carriage, fixed taking-hooks for removing staple from the hopper, and fixed carding- and ground-hooks.

7. The combination with a carriage and a hopper connected to the same, of zones of reversely pointing hooks mounted on the carriage in front of the hopper, carrying-hooks behind the hopper, zones of reversely pointing taking- and picking and opening-hooks below said carriage, and a seed-removing grid through which hooks carry staple.

8. The combination with a carriage and a hopper connected to the same, of fixed hooks for removing staple from the hopper, moving and fixed picking and opening hooks, and hooks behind the hopper for passing staple from the taking-hooks to the picking and opening-hooks.

9. The combination with a carriage and a hopper connected to the same, of carrier-, picking and opening-, and delivery-hooks on said carriage, fixed hooks for removing staple from said hopper, fixed picking and opening hooks, a grid through which said delivery-hooks draw staple, and means for removing staple from said delivery hooks.

10. The combination with a carriage and a hopper connected to the same, of carrier-, picking and opening-, and delivery-hooks on said carriage, fixed taking-hooks for removing staple from said hopper, fixed picking and opening hooks, a grid through which said delivery-hooks draw staple, and fixed hooks for removing staple from said delivery-hooks.

11. In a cotton-gin, the combination with means for gradually opening cotton fibers on the seeds, said means comprising a series of reciprocating hooks, of a grid and reciprocating hooks for carrying the fibers through the grid.

12. In a cotton-gin, the combination with means for gradually opening cotton fibers on the seeds, said means comprising a series of reciprocating hoks, of a grid, reciprocating hooks for carrying the fibers through said grid, and fixed hooks for removing the fibers from said carrying-hooks.

13. The combination with a carriage and a hopper connected to the same, of carrier-, picking and opening-, and delivery-hooks on said carriage, fixed taking-hooks for removing staple from said hopper, fixed picking and opening hooks, ground-hooks interspersed among said fixed carding-hooks, a grid through which staple is drawn by said delivery-hooks, and means for removing staple from the delivery-hooks.

14. The combination with a carriage and a hopper connected to the same, of carrier-, picking and opening-, and delivery-hooks on said carriage, fixed hooks for removing staple from said hopper, fixed picking and opening hooks, ground-hooks interspersed among the fixed carding-hooks, a fixed grid through which said delivery-hooks draw staple, and fixed hooks for removing staple from said delivery-hooks.

15. The combination of a carriage, a hopper connected thereto, carrier- picking and opening- and delivery-hooks mounted on said carriage, a frame adjustable toward and from the path of said carriage, taking- and picking and opening hooks mounted on said adjustable frame, and a fixed grid through which the said delivery-hooks draw staple.

16. The combination of a to and fro moving hopper, with fixed hooks for removing staple from the bottom of said hopper.

17. The combination with a to and fro moving hopper, of fixed hooks for removing staple from the bottom of said hopper, a set of picking and opening-hooks, and hooks moving with the hopper for carrying staple from said fixed hooks over to the picking and opening hooks.

18. The combination of parallel rows of standing hooks alternately long and short and intervening rows of yet shorter hooks, with parallel rows of hanging hooks alternately long and short, and means for causing relative motion of the hanging and the standing hooks in the direction of the length of said rows.

19. The combination of a metal strip provided with slots in one edge, hooks set into said slots, and retaining or cheek strips at the sides of the said slotted strip, with means for fastening all said strips together.

20. A frame comprising metal strips provided with slots in one edge, hooks set into said slots, retaining-strips at the sides of said slotted strips, spacing-washers between said retaining-strips, and rods for connecting said strips together.

21. A frame comprising metal strips provided with slots in one edge thereof, hooks set into said slots, retaining-strips at the sides of said slotted strips, intercalated single strips provided with hooks, spacing-washers between said intercalated and said retaining strips, and rods for connecting all said strips together.

22. Two co-acting opening and ginning devices, the upper of which comprises metal strips provided with slots in their lower edges, hooks hanging from said slots, retaining-strips at the sides of said strips, spacing washers between said retaining strips, and rods for connecting all said strips together, and the lower of which devices comprises metal strips provided with slots in their upper edges, hooks standing up from said slots, retaining-strips at the sides of said slotted strips, intercalated single strips provided with short upstanding hooks, spacing-washers between said intercalated and said retaining-strips, and rods for connecting all said strips together.

23. A grid consisting of a slotted bottom, vertically disposed ties, and inclined reeds.

24. A grid consisting of a slotted bottom, vertically disposed ties, and inclined reeds, combined with reciprocating pins or hooks for drawing staple between said ties and between said reeds.

25. A grid consisting of a slotted bottom, vertically disposed ties, and inclined reeds, combined with reciprocating pins or hooks for drawing staple between said ties and between said reeds, and means for removing staple from said pins or hooks.

26. A grid consisting of a slotted bottom, vertically disposed ties, and inclined reeds, combined with reciprocating pins or hooks for drawing staple between said ties and between said reeds, and fixed pins or hooks for removing staple from said reciprocating pins or hooks.

27. A grid consisting of a slotted bottom and inclined reeds formed from one piece of metal combined with vertically disposed ties for connecting said bottom and the ends of said reeds.

28. A grid consisting of a slotted bottom, inclined reeds, and vertically disposed ties, all formed from one piece of metal.

29. The combination of a carriage provided with a hopper-holder near one end, a cross-rod on said holder, a slotted plate on said carriage beneath said holder, and an open-bottomed hopper having slotted sides for coaction with said rod.

30. The combination with a carriage provided with an opening therein near one end, of a slotted plate beneath said opening, and hooks extending above the level of said plate and adapted to remove cotton or other staple from said plate through said slots as the carriage moves in one direction.

31. The combination of a carriage provided with an opening therein near one end thereof, a slotted plate beneath said opening, fixed hooks extending above the level of said plate and entering said slots to remove staple as the carriage moves in one direction, and hooks on said carriage for removing staple from said fixed hooks as the carriage moves in the other direction.

32. The combination of a grid, reciprocating pins or hooks for drawing staple through the same, an incline on to which the hooks drop the staple, and condensing-rolls to which said incline guides the staple.

33. The combination of a grid, reciprocating hooks or pins for drawing staple through the grid, an incline on to which the staple is dropped, fixed hooks for removing staple from said pins or hooks, and condensing-rolls to which said incline guides the staple.

34. In a cotton-gin, the combination with a hopper and a fixed grid, of means for gradually opening and loosening the cotton fibers while on the seeds by a series of steps or operations, part of said means consisting of hooks which remove raw or seed cotton from said hopper, and part of said means consisting of reciprocating hooks which carry the fibers through said grid.

35. In a cotton-gin, the combination of two relatively movable members provided with reversely acting points for gradually opening and loosening cotton fibers while on the seeds, with means for thereafter separating seeds from fibers.

36. The combination of fixed and reciprocating points for gradually opening cotton fibers on the seeds in or by a series of steps or operations, with a grid, and reciprocating hooks for carrying the fibers through said grid.

37. The combination with fixed and reciprocatory points for gradually opening the cotton fibers on the seeds in or by a series of steps or operations, of a grid, reciprocating hooks for carrying the fibers through said grid, and means other than said grid for removing the fibers from said hooks.

Signed at New York city in the county of New York and State of New York this 26th day of April, A. D. 1906.

FRANCIS JOSEPH MAUBORGNE.

Witnesses:
R. W. BACKLEY,
ALBERT H. STOUT.